United States Patent [19]

Yamada

[11] 4,098,284
[45] Jul. 4, 1978

[54] SAFETY DEVICE FOR GAS SUPPLY PIPE

[76] Inventor: Masafusa Yamada, 10-9 Azuma-bashi 3-chome, Sumida-ku, Tokyo, Japan

[21] Appl. No.: 756,676

[22] Filed: Jan. 4, 1977

[51] Int. Cl.² .............................................. F16K 17/36
[52] U.S. Cl. ...................................... 137/39; 137/456; 137/613; 251/68; 251/70
[58] Field of Search ...................... 137/38, 39, 65, 66, 137/80, 456, 457, 613; 251/68, 69, 70; 431/22, 88, 89

[56] References Cited
U.S. PATENT DOCUMENTS

| | | | |
|---|---|---|---|
| 2,652,065 | 9/1953 | Kutzler | 251/69 X |
| 3,506,033 | 4/1970 | Haney | 137/613 X |

*Primary Examiner*—Robert G. Nilson
*Attorney, Agent, or Firm*—Frank J. Jordan

[57] ABSTRACT

A gas supply pipe is provided with a terminal shutoff valve upstream of a heater, stove or the like. An automatic shutoff valve is provided to the gas pipe upstream of the terminal shutoff valve which automatically closes upon receipt of an electrical signal from an earthquake sensor, fire detector, gas leak detector or other sensor indicating a dangerous condition. A gas pressure sensor provided between the automatic shutoff valve and the terminal shutoff valve prevents the automatic shutoff valve from being manually reset unless the terminal shutoff valve is closed, thereby preventing an explosion which might result if gas were fed to the heater or stove with the pilot light extinguished.

7 Claims, 7 Drawing Figures

SAFETY DEVICE FOR GAS SUPPLY PIPE

BACKGROUND OF THE INVENTION

The present invention relates to a safety device for a municipal or similar gas supply pipe.

Earthquakes are a major hazzard in a number of areas of the world. While the earthquakes themselves cause major damage, the damage is greatly compounded by secondary explosions and fires. For this reason, it is of extreme importance to limit earthquake damage by preventing, as much as possible, these secondary explosions and fires which take such a tragic toll in lives and property.

One means of preventing explosions in municipal gas systems has been devised which automatically shuts off the gas supply to users when an earthquake, fire, gas leak or the like is sensed. The system provides automatic shutoff valves to the users' gas pipes which are triggered by an electrical signal from an earthquake, fire or gas leak sensor to close thereby shutting off the gas supply downsteram of the valves. It has been found in practice that this system significantly contributes to reducing the total damage caused by earthquakes and also explosions caused by gas leaks.

However, an important safety element is missing in the system described above in that gas explosions have occured after the earthquakes are over. The reason for this is that since the automatic shutoff valves shut off the gas supply to heaters, stoves and the like in individual homes, they necessarily extinguish the pilot lights. When the gas supply is restored, the gas supplied to the heaters is not immediately combusted due to the absence of a pilot light and accumulates in the area of the heater. The gas accumulation itself is deadly to persons exposed thereto and may be combusted by a spark in a refrigerator compressor motor, a lighted match or any other small heat source resulting in a disasterous explosion. The gas accumulation may also be ignited by the person relighting the pilot light, practically ensuring the person's fatality in the resulting explosion.

SUMMARY OF THE INVENTION

It is a most important object of the present invention to improve an automatic shutoff system for municipal gas supply pipes which shuts off the gas supply in response to a sensed earthquake, fire, gas leak or the like, to positively prevent explosions when the gas supply is restored.

It is another important object of the present invention to substantially reduce the total damage caused by earthquakes in urban areas.

It is another object of the present invention to provide a safety device for a gas pipe to prevent gas from being supplied to heaters, stoves and the like following an earthquake unless the terminal shutoff valves to these units are closed.

In brief, a gas supply pipe is provided with a terminal shutoff valve upstream of a heater, stove or the like. An automatic shutoff valve is provided to the gas pipe upstream of the terminal shutoff valve which automatically closes upon receipt of an electrical signal from an earthquake sensor, fire detector, gas leak detector or other sensor indicating a dangerous condition. A gas pressure sensor provided between the automatic shutoff valve and the terminal shutoff valve prevents the automatic shutoff valve from being manually reset until the terminal shutoff valve is closed, thereby preventing an explosion which might result if gas were fed to the heater or stove with the pilot light extinguished.

It is another object of the present invention to provide a generally improved safety device for a gas supply pipe.

Other objects, together with the foregoing, are attained in the embodiment described in the following description and illustrated in the accompanying drawing.

DESCRIPTION OF THE PREFERRED EMBODIMENT

While the gas pipe safety device of the invention is susceptible of numerous physical embodiments, depending upon the environment and requirements of use, substantial numbers of the herein shown and described embodiment have been made, tested and used, and all have performed in an eminently satisfactory manner.

Figure 1:
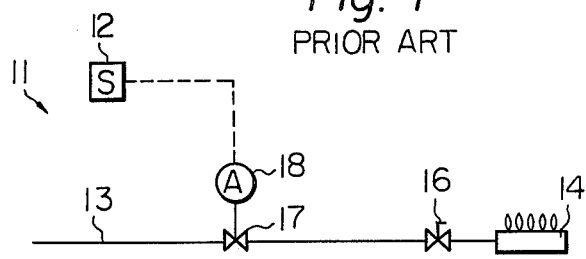
FIG. 1 is a schematic diagram of a prior art safety device.

Referring now to FIG. 1 of the drawing, a prior art safety system 11 comprises a sensor 12 which may detect an earthquake, fire, gas leak or other dangerous condition. A municipal gas supply pipe 13 leads to a consumption unit such as a gas heater 14 provided in an individual home. A terminal shutoff valve 16 of the manually operated type is disposed in the gas pipe 13 upstream of the heater 14. An automatic shutoff valve 17 is disposed in the gas pipe 13 upstream of the terminal shutoff valve 16. The sensor 12 is connected to control the valve 17 by means of an actuator unit 18.

The valves 17 and 16 are normally open allowing gas to be supplied to the heater 14. When the sensor 12 detects a dangerous condition, it generates and feeds an electrical shutoff signal to the actuator unit 18 which closes the valve 17 in response thereto. This terminates the supply of gas through the pipe 13 downstream of the valve 17, reducing the danger of an explosion or fire resulting from, for example, rupture of the pipe 13 downstream of the valve 17 due to the effects of an earthquake.

After the danger has passed, the actuator 18 is manually reset to its valve opening position to restore the supply of gas to the heater 14. However, when the gas supply was shut off the pilot light (not shown) of the heater 14 was extinguished. Restoration of the gas supply will result in a dangerous accumulation of gas in the area of the heater 14 unless the terminal shutoff valve 16 is closed before the gas supply is restored. Under large scale earthquake conditions, the possibility that the person resetting the actuator 18 to the valve opening position will fail to close the valve 16 is considerable, especially if the valve 17 is provided upstream of a number of terminal valves 16 fed from the same gas pipe 13.

Figure 2:
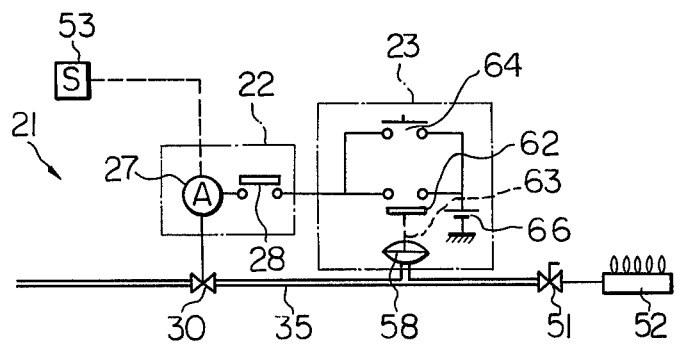
FIG. 2 is a schematic diagram of a safety device embodying the present invention.
Figure 6:
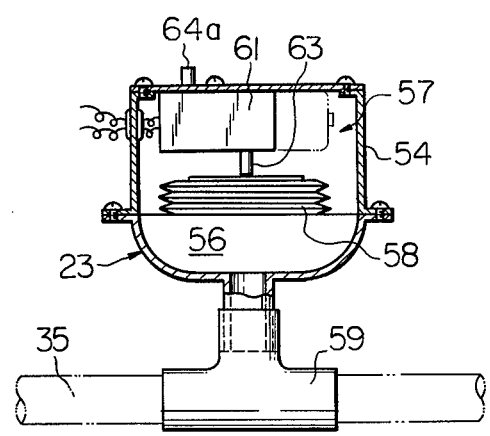
FIG. 6 is a side elevation, partly cut away, of a gas pressure sensor unit of the present safety device.
Figure 7:
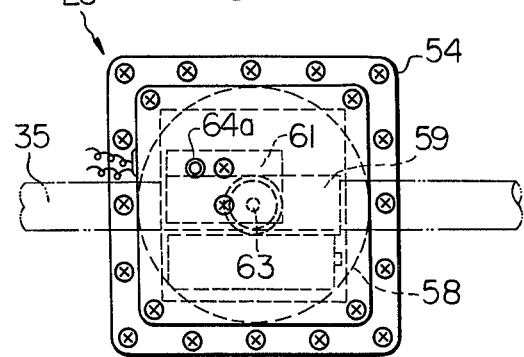
FIG. 7 is plan view of the gas pressure sensor unit.

This possibility is eliminated by the safety device of the present invention which is illustrated in FIGS. 2 to 7 and is generally designated by the reference numeral 21. The device 21 comprises an actuator unit 22 which is shown in FIGS. 2, 3, 4 and 5 and a gas pressure sensor unit 23 which is shown in FIGS. 2, 6 and 7. As best viewed in FIG. 3, the actuator unit 22 comprises a housing 24 provided with a horizontal partition 26. An actuator assembly 27 is provided in the lower portion of the housing 24 below the partition 26 and a cutout switch 28 is provided in the upper portion of the housing 24 above the partition 26. A valve actuator tube 29 slidably extends through the bottom wall 31 of the housing 24 and is connected to control the opening and closing of an automatic shutoff valve 30 provided in a gas supply pipe 35. A latch sleeve 32 is integrally fitted to the actuator tube 29 and is formed with a downwardly facing shoulder 32a and an upwardly facing shoulder 32b above the shoulder 32a. A generally U-shaped latch lever 33 is pivotally mounted to the bottom wall 31 of the housing 24 about a pin 34 and is urged counterclockwise by a wire spring 36. The upper end of the left arm (not designated) of the latch lever 33 rotatably supports a roller 37 which is adapted to engage with the shoulder 32a of the sleeve 32 and prevent downward movement of the sleeve 32 and actuator tube 29. An electromagnetic solenoid 38 is mounted on the bottom wall 31 to the right of the latch lever 33 and comprises a plunger 38a which is pivotally connected to the right arm (not designated) of the latch lever 33.

In a similar manner, a generally U-shaped latch lever 39 is pivotally mounted on the bottom wall 31 about a pin 41 and is urged clockwise by a wire spring 42. A roller 43 is rotatably supported at the upper end of the left arm (not designated) of the latch lever 39 and is adapted to engage with the shoulder 32b of the sleeve 32 and prevent the sleeve 32 and actuator tube 29 from moving upwardly. An electromagnetic solenoid 44 mounted on the bottom wall 31 has a plunger 44a which is pivotally connected to the left arm (not designated) of the latch lever 39.

Figure 4:
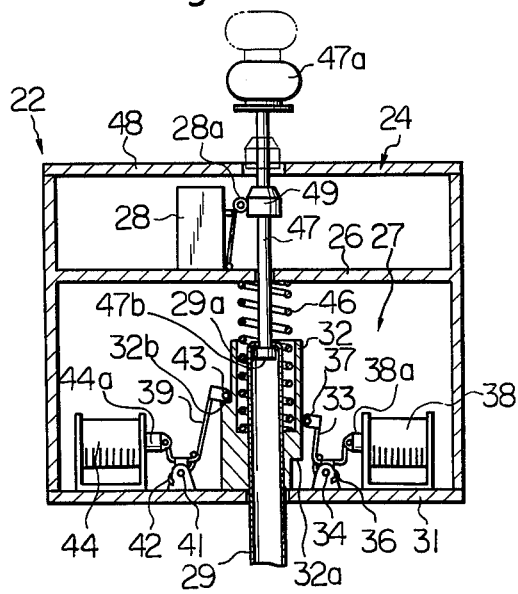
FIG. 4 is similar to FIG. 3 but shows the valve unit in a valve closing position.
Figure 5:
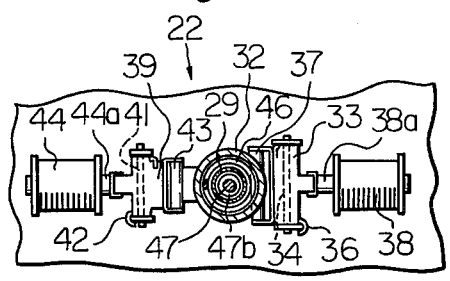
FIG. 5 is a section taken on a line 5—5 of FIG. 3.

A compression spring 46 urges the sleeve 32 and actuator tube 29 downwardly toward a valve closing position in which the lower end of the sleeve 32 abuts against the bottom wall 31 as shown in FIG. 4. The upper end of the actuator tube 29 is formed with a constricted neck 29a through which slidably extends a manual reset rod 47. A knob 47a is provided at the upper end of the reset rod 47 above the upper wall 48 of the housing 24. The lower end of the reset rod 47 terminates in a stopper 47b which has a diameter perferably equal to the inner diameter of the actuator tube 29 for sliding guidance therein. A generally conical cam sleeve 49 is fixed to the reset rod 47 between the partition 26 and the upper wall 48, the reset rod 47 being normally urged downwardly by gravity so that the cam sleeve 49 rests on the partition 26. The cam sleeve 49 is engageable with an actuator arm 28a of the cutout switch 28 as will be described in detail below.

As best seen in FIG. 2, the automatic shutoff valve 30 is provided in the gas pipe 35 upstream of a terminal shutoff valve 51 which is in turn disposed upstream of a gas heater 52 in the same manner as in the prior art. Also similarly, a sensor 53 for generating and feeding an electrical shutoff signal to the solenoid 38 of the actuator unit 27 in response to a sensed earthquake, fire, gas leak or the like is illustrated in FIG. 2.

With reference being made concurrently to FIGS. 2, 6 and 7, the gas pressure sensor unit 23 comprises a housing 54 which is partitioned into a lower pressure chamber 56 and an upper switch chamber 57 by a flexible bellows or diaphragm 58. The housing 54 is connected to the gas pipe 35 by a T-joint 59 so that the pressure chamber 56 is exposed to the gas pressure in the gas pipe 35 between the automatic shutoff valve 30 and the terminal shutoff valve 51.

A disable switch unit 61 is mounted in the switch chamber 57 and comprises a disable switch 62 which is actuated by the diaphragm 58 through an actuator rod 63. Connected in parallel with the disable switch 62 is a manual reset switch 64 which is normally open and may be manually closed by depressing a button 64a which extends above the housing 54. A power source symbolized by a battery 66 is connected in a series circuit with the parallel combination of the switches 62 and 64, the cutout switch 28 and the solenoid 44 of the actuator unit 27.

Figure 3:
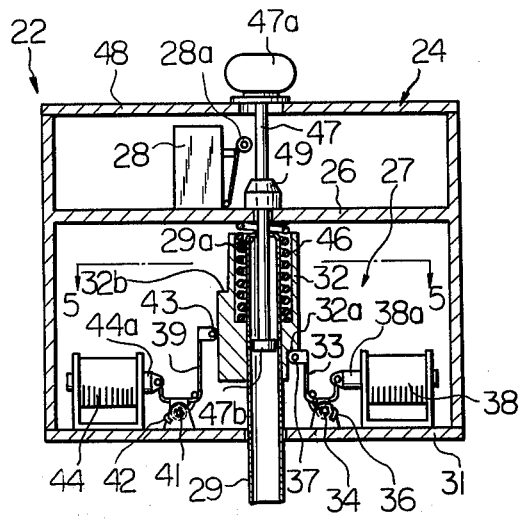
FIG. 3 is a vertical sectional view of an automatic shutoff valve unit of the present safety device in a valve opening position.

During normal operation of the heater 52, the terminal shutoff valve 51 and the automatic shutoff valve 30 are both open thereby allowing gas supply to the heater 52 through the pipe 35. The pilot light (not shown) of the heater 52 must of course be lighted. The status of the actuator unit 22 is as shown in FIG. 3. Specifically, the actuator tube 29 is in an upper position in which it opens the automatic shutoff valve 30. The roller 37 of the latch lever 33 is in engagement with the shoulder 32a of the sleeve 32 thereby preventing the spring 46 from moving the sleeve 32 and actuator tube 29 downwardly. The reset rod 47 is in its reset position with the cam sleeve 49 disengaged from the actuator arm 28a of the cutout switch 28 thereby rendering the cutout switch 28 open.

When the sensor 53 detects an earthquake, fire or gas leak, it feeds the electrical shutoff signal to the solenoid 38 which causes the plunger 38a to be retracted (moved rightwardly in FIG. 3) into the body of the solenoid 38. This causes the latch lever 33 to pivot clockwise so that the roller 37 disengages from the shoulder 32a of the sleeve 32. This releases the sleeve 32 so that the sleeve 32 and actuator tube 29 are moved downwardly by the spring 46 to close the automatic shutoff valve 30 and terminate the supply of gas to the heater 52 through the gas pipe 35. This reduces the total earthquake or fire damage by making the gas supply to the heater 52 unavailable for supporting combustion. The sensor 53 need only generate the shutoff signal for a brief interval, for example one second, since once the actuator tube 29 is moved downwardly by the spring 46 to the valve closing position it is unnecessary to maintain the solenoid 38 energized. The spring 36 then moves the latch lever 33 so that the roller 37 engages an inoperative portion of the sleeve 32. The latch lever 39 is pivoted clockwise by the spring 42 so that the roller 43 engages with the shoulder 32b of the sleeve 32 thereby preventing the sleeve 32 and actuator tube 29 from being moved upwardly.

In cases where the terminal shutoff valve 51 was closed before the automatic shutoff valve 30 was closed by the sensor 53 and not subsequently opened, the gas supply to the terminal shutoff valve 51 may be restored simply by pulling upwardly on the knob 47a of the reset rod 47. More specifically, with the terminal shutoff valve 51 closed and the automatic shutoff valve 30 subsequently closed, gas under full supply pressure is trapped in the portion of the pipe 35 between the valves 30 and 51. This gas pressure urges the diaphragm 58 of the gas pressure sensor unit 23 upwardly. This movement is transmitted to the disable switch 62 through the actuator rod 63 thereby closing the switch 62. The voltage of the battery 66, constituting an electrical reset signal, is thereby applied to the cutout switch 28 through the disable switch 62.

When the reset rod 47 is pulled upwardly to the position shown in solid line in FIG. 4, the cam sleeve 49 engages with the actuator arm 28a of the cutout switch 28 thereby closing the cutout switch 28 and applying the voltage of the battery 66 therethrough to the solenoid 44 which energizes the same. The plunger 44a is retracted leftwardly into the body of the solenoid 44 thereby pivoting the latch lever 39 counterclockwise so that the roller 43 disengages from the shoulder 32b of the sleeve 32. Examination of FIG. 4 will disclose that in the solid line position of the reset rod 47 the stopper 47b just engages with the neck 29a of the actuator tube 29. With the solenoid 44 holding the roller 43 disengaged from the sleeve 32, further upward movement of the reset rod 47 to the phantom line position in FIG. 4 will pull the actuator tube 29 upwardly so that the roller 37 drops onto the shoulder 32a and prevents the actuator tube 29 from being moved downwardly by the spring 46. The cam sleeve 49 is configured long enough to close the cutout switch 28 until the shoulder 32b clears the roller 43. When the knob 47a is released, the reset rod 47 is returned by gravity to the position of FIG. 3 in which the cam sleeve 49 disengages from the actuator arm 28a of the cutout switch 28 thereby opening the cutout switch 28 and disengaging the solenoid 44. This operation opens the automatic shutoff valve 30 and latches the actuator tube 29 in the valve opening position thereby restoring the supply of gas to the terminal shutoff valve 51. The valve 51 may subsequently be opened and the pilot light lighted to bring the heater 52 into service.

In cases where the terminal shutoff valve 51 was open when the automatic shutoff valve 30 was closed, it is dangerous to re-open the valve 30 since the gas supply to the heater 52 would be restored without means (a pilot light) available for controlled combustion. The present device 21 positively prevents the automatic shutoff valve 30 from being opened under these conditions and thereby substantially reduces the danger of secondary explosions following earthquakes.

With the valve 30 closed and the valve 51 open, the pressure in the gas pipe 35 downstream of the valve 30 drops to zero. This causes the diaphragm 58 of the gas pressure sensor unit 23 to relax and move downwardly. This movement is transmitted to the disable switch 62 through the actuator rod 63 causing the switch 62 to open. This makes it impossible to open the automatic shutoff valve 30 since the roller 43 of the latch lever 39 is in engagement with the shoulder 32b preventing the sleeve 32 and actuator tube 29 from being pulled upwardly from the valve closing position.

The person restoring the gas supply is therefore forced to close the terminal shutoff valve 51 and close the manual reset switch 64 which is preferably of the type which will latch closed when depressed and be opened by the actuator rod 63 when the same is moved upwardly by the diaphragm 58 when the automatic shutoff valve 30 is opened and gas pressure supplied to the terminal shutoff valve 51. With the reset switch 64 closed, the voltage of the battery 66 is applied therethrough to the cutout switch 28 so that the solenoid 44 may be energized by pulling the knob 47a upwardly in the same manner described above.

Preferably, the gas pressure sensor 23 is provided in close proximity to the terminal shutoff valve 51 to ensure that the person restoring the gas supply will close the terminal shutoff valve 51 before pressing the button 64a to close the reset switch 64. Although only one terminal shutoff valve 51 is shown and described as being connected to the gas supply pipe 35, the present invention is directly applicable to a municipal gas system in which a number of terminal shutoff valves 51 are fed from the same gas pipe 35 since the gas pressure sensor 23 provided upstream of the terminal shutoff valves 51 will prevent opening of the automatic shutoff valve 30 when any of the terminal shutoff valves 51 is open.

In summary, it will be seen that the present invention is a substantial contribution to the art since it serves to reduce the tragedy caused by earthquakes, fires and explosions resulting from gas leaks. Many modifications will become possible for those skilled in the art after receiving the teachings of the present disclosure without departing from the scope thereof.

What is claimed is:

1. A safety device for a gas pipe having a terminal shutoff valve comprising:
    an automatic shutoff valve provided to the gas pipe upstream of the terminal shutoff valve including an actuator member and biasing means urging the actuator member toward a valve closing position;
    first latch means for latching the actuator member in a valve opening position and being actuatable by an electrical shutoff signal to release the actuator member allowing the actuator member to be moved to the valve closing position by the biasing means;
    second latch means for latching the actuator member in the valve closing position; and
    sensor means for generating and feeding an electrical reset signal to the second latch means to actuate the second latch means to release the actuator member for manual movement to the valve opening position against the force of the biasing means when the terminal shutoff valve is closed.

2. A safety device as in claim 1, further comprising manual reset signal generator means for generating and feeding the reset signal to the second latch means independently of the sensor means.

3. A safety device as in claim 1, in which the sensor means comprises a gas pressure sensor provided to the gas pipe between the automatic shutoff valve and the terminal shutoff valve for generating the reset signal when the sensed gas pressure is above a predetermined value.

4. A safety device as in claim 3, in which the gas pressure sensor comprises a pressure sensitive diaphragm and a reset switch actuated by the diaphragm to cause generation of the reset signal when the sensed gas pressure is above the predetermined value.

5. A safety device as in claim 4, further comprising a manual reset switch connected in parallel with the reset switch of the gas pressure sensor to generate the reset signal independently of the gas pressure sensor.

6. A safety device as in claim 1, in which the first and second latch means each comprise electromagnetic solenoid means.

7. A safety device as in claim 6, in which the electromagnetic solenoid means of each of the first and second latch means comprises a latch member and biasing means urging the latch member into operative engagement with the actuator member, the electromagnetic solenoid means moving the latch member out of engagement with the actuator member when actuated by the respective electrical signal.

* * * * *